United States Patent
Ludlum

[15] 3,666,091
[45] May 30, 1972

[54] APPARATUS FOR SEPARATING FRUITS AND VEGETABLES FROM LEAVES, VINES, AND THE LIKE

[72] Inventor: William J. Ludlum, Moorestown, N.J.
[73] Assignee: Campbell Soup Company, Camden, N.J.
[22] Filed: Jan. 6, 1970
[21] Appl. No.: 956

[52] U.S. Cl.................................209/12, 209/143, 209/17, 209/45, 209/380
[51] Int. Cl.........................................B03b 7/00
[58] Field of Search................209/45, 210, 17, 12, 155, 156, 209/173, 458, 460, 114, 115, 120

[56] References Cited

UNITED STATES PATENTS

| 2,475,823 | 7/1949 | Dauenhauer | 209/12 |
| 1,209,900 | 12/1916 | Stebler et al. | 209/156 X |
| 1,507,951 | 9/1924 | Buckley | 209/173 |
| 2,035,118 | 3/1936 | Falkiner | 209/173 |
| 2,226,009 | 12/1940 | Miller | 209/12 |
| 3,042,198 | 7/1962 | Slavich | 209/458 X |
| 3,252,691 | 5/1966 | Getzin et al. | 209/380 X |

FOREIGN PATENTS OR APPLICATIONS 258,833  1/1927  Great Britain...........................209/12

Primary Examiner—Frank W. Lutter
Assistant Examiner—Ralph J. Hill
Attorney—Howson and Howson

[57] ABSTRACT

Apparatus for separating fruits and vegetables from leaves, vines and the like which includes a flume containing a flow of water in which the fruits and plant waste material are carried; a series of generally upright, spaced-apart inclined rods located within and across the flume with upper ends inclined in the direction of flow; and an inclined endless belt having a flat, upwardly moving surface transverse to the direction of flow and a lower end in the flume. The angle of inclination and the speed of movement of the belt, together with the coarseness of its surface, causes the leaves and vines to adhere to the belt and be drawn out of the flume while the fruits roll down the belt to be carried along in the flume. The modification of this invention provides for the fruits, leaves and vines to be discharged on to the top of a similarly inclined, upwardly moving belt whereby the fruits roll down and off the belt to be collected for processing while the vines and leaves adhere to the belt and are carried upwardly to be discharged over the top and collected for disposal.

6 Claims, 3 Drawing Figures

Patented May 30, 1972

INVENTOR.
William J. Ludlum

BY Harold S. O'Brien
ATTORNEY.

INVENTOR.
William J. Ludlum
ATTORNEY.

Patented May 30, 1972

INVENTOR.
William J. Ludlum

BY

Harold S. O'Brien Jr.

ATTORNEY.

APPARATUS FOR SEPARATING FRUITS AND VEGETABLES FROM LEAVES, VINES, AND THE LIKE

This invention relates generally to apparatus for mechanically separating fruits and vegetables, such as tomatoes, from the leaves, and vines, and stems which are normally collected when the fruits and vegetables are harvested.

The harvesting of fruits and vegetables, whether accomplished manually or by mechanical means, normally collects the vines, leaves, stems, weeds, and other plant materials, referred to as trash or waste, in addition to the desired fruits or vegetables. During the processing of the fruit, the trash or waste must be separated and discarded. It has been found to be time consuming and expensive to separate and remove the trash by hand so that mechanical means of accomplishing this result is presently in demand in the industry.

SUMMARY OF THE INVENTION

Therefore, it is the primary object of this invention to provide apparatus and process for mechanically separating fruits and vegetables from the unwanted plant parts and weeds collected during harvesting.

It is another object of this invention to provide apparatus to accomplish the above object which does not bruise or injure the fruit, which is inexpensive to operate, and which may be readily included in the cleaning and processing operations employed in the industry.

In summary, the preferred apparatus of this invention includes an inclined endless belt, the combined material being placed on the upwardly moving portion of the belt whereby the shape and size of the waste material causes that material to adhere to the belt and be carried in one direction while the fruits roll off in another direction. The preferred apparatus of this invention may also include a water-filled flume to transport the material to the belt and also a series of inclined rods located within the flume to direct the trash material toward the surface of the water where it will be more readily washed on the belt for subsequent removal.

These and another objects and advantages of this invention will become more apparent from the description of the preferred form of the apparatus and process set forth herein and from reference to the drawings, wherein.

Figure 1:
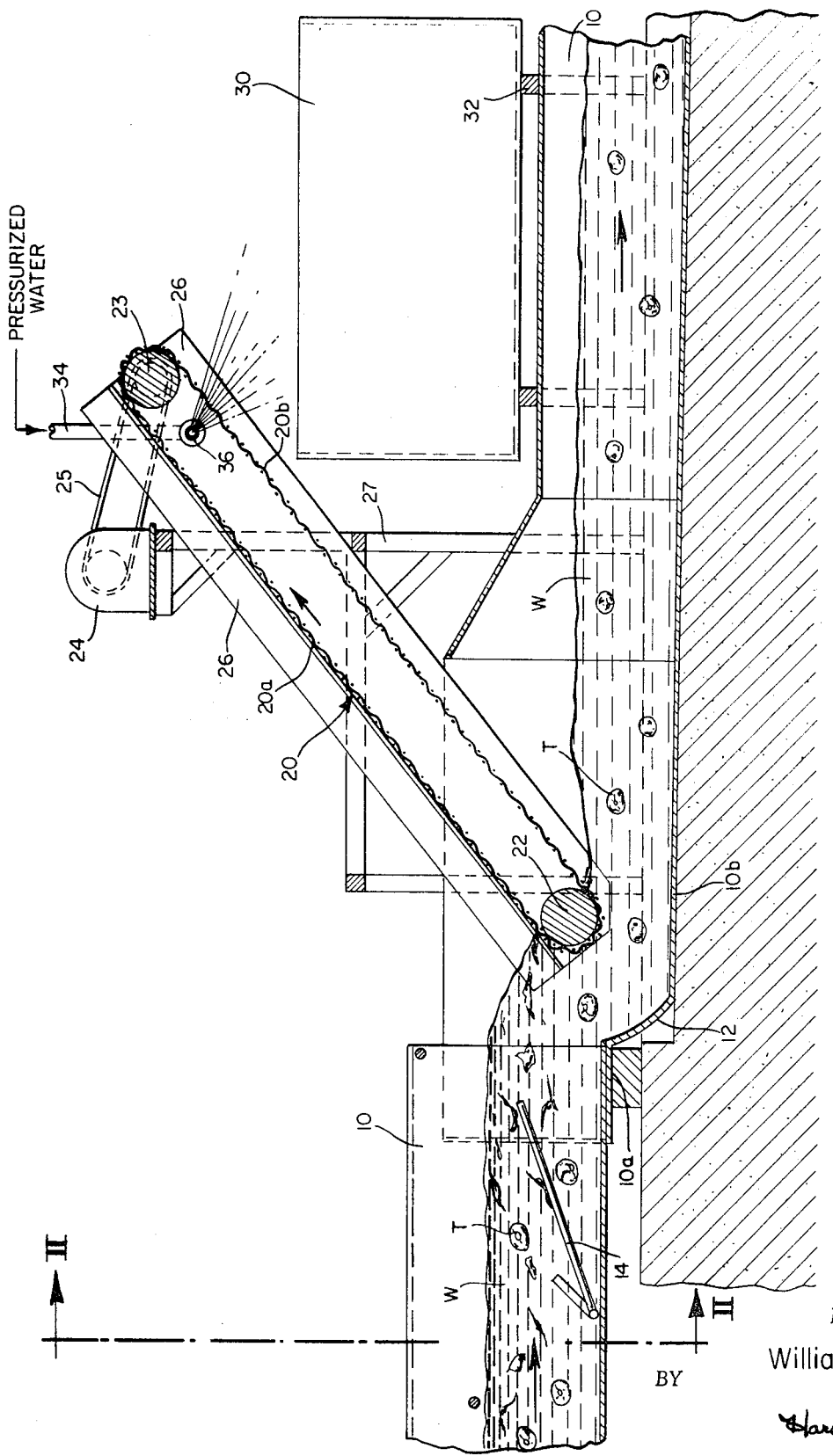
FIG. 1 is a diagrammatic side view of the preferred form of the apparatus taken along the lines and arrows I—I of FIG. 2.

The preferred form of the apparatus of this invention, reference being made initially to FIG. 1, includes a generally U-shaped flume 10 containing water W flowing from the left to the right and carrying vegetables or fruits, such as tomatoes T, along with leaves, vines, stems, weeds, and other waste plant material, as indicated generally. In actual practice, the quantity of tomatoes and waste material present in the water are much greater than that shown in FIG. 1. The tomatoes and other material are generally distributed throughout the water but the lighter plant material tends to float to the top of the water. For the purpose of describing this invention it will be assumed that the fruits to be separated from plant waste material are tomatoes, but it should be noted that the invention is effective with other, generally round fruit, such as lemons and apples.

At one point along its length, flume 10 is provided with a drop 12 which causes the water W to spill over and cascade from the initial level of flume bottom 10a to the lower flume bottom 10b and then continue at a slightly lower level through the remaining portions of the flume to carry the tomatoes to a further processing station not shown. As a specific illustration, the flume may be 18 inches high, 18 inches across the top, and the drop may be 7 inches in height. In place of drop 12, a weir or dam may be placed in the flume. The drop 12 causes the waste material floating generally along the top of the water to be thrown outwardly by the tumbling water onto the bottom of belt 20 while the tomatoes, which are largely beneath the surface, pass beneath the belt and continue down the flume. The lower end of belt 20, while being located a distance above the flume bottom 10b, is sufficiently beneath the water surface along flume bottom 10a to catch the surface portion of the water and its contents as they spill to the lower level.

Several rigid rods 14 (FIGS. 1 and 2) are stationarily mounted within the flume preceding drop 12, the rods extending generally upwardly from the bottom of the flume toward the surface of the water but are inclined in the direction of flow. It has been found satisfactory to incline rods 14 at an angle of 20° from the horizontal plane but generally similar results may be obtained by inclining the rods at an angle between 10° and 60°. Positioned as such, the rods deflect upwardly a major portion of the waste material toward the surface of the water as the waste is carried along in the flow. The round tomatoes are generally not deflected upwardly but pass through and around the rods at a lower level in the flume. The effectiveness of rods 14 in segregating the waste material to the top of the flow depends to some extend upon the rate of flow of the water W and the difference between the size and shape of the waste materials and the fruit. If the waste plant material and fruit were smaller, then the rods should be spaced closer to each other or of different size from that shown in FIGS. 1 and 2 for best results.

An endless belt 20, mounted for movement around sprockets 22, 23, in a clockwise direction as shown in FIG. 1, is located partially within the flume with the flat, upwardly moving surface 20a of the belt (FIG. 2) transverse to the direction of the flume and flow of water. Belt 20 is preferably formed of linked wires so as to be sufficiently porous to allow water to freely flow through it and then down the flume while the waste material is caught on the belt. The belt is driven by electric motor 24 and drive belt 25 connected to top sprocket 23. Sprockets 22 and 23 are supported by frame 27 and other structure not shown and side panels 26 retain the material on the belt. The belt is preferably inclined at an angle of approximately 38° from the horizontal plane but satisfactory results may be obtained by placing the belt at an angle with 10° to 50° under certain conditions. It has been found that a belt speed of approximately 83 feet per minute removes the waste material as it accumulates on the belt but this speed is depended upon the amount of waste in the water and the rate of flow of the water.

A cubical trash container 30 is supported on stantions 32 above the flume and located beneath the top end of belt 20 to collect the waste material falling from the belt. Container 30 is designed to be readily removable by a fork-lift truck for ultimate disposal of the waste material.

A pipe 34 having a spray nozzle 36 is located behind the descending belt portion 20b to dislodge vines and leaves which cling to the belt after it passes around sprocket 23.

The preferred form of the apparatus of this invention functions substantially as follows. Fruits or vegetables together with leaves, vines, and other waste material collected in the harvesting of the crop are dumped into the flowing water W in flume 10 at a location in front of rods 14. The tomatoes and trash become generally distributed throughout the water as it flows toward rods 14. As the water flows around rods 14, the longer and larger leaves and vines catch and ride up along the rods so that the trash tends to become concentrated along the surface of the water.

The water and contents then passes over the drop 12 which throws the top portion of the water onto the upwardly moving belt surface 20a which retains the leaves and vines on the belt as the water drains through the belt. A substantial portion of the tomatoes T flow beneath belt 20 and lower sprocket 22 and along the flume for further processing. As the belt surface 20a moves upwardly, the collected trash is continually lifted out of the water and raised above container 20 into which it then drops. The angle of inclination of the belt together with the motion of the bell allows the generally round tomatoes caught on the belt to readily roll down and fall back into the flowing water.

Figure 2:
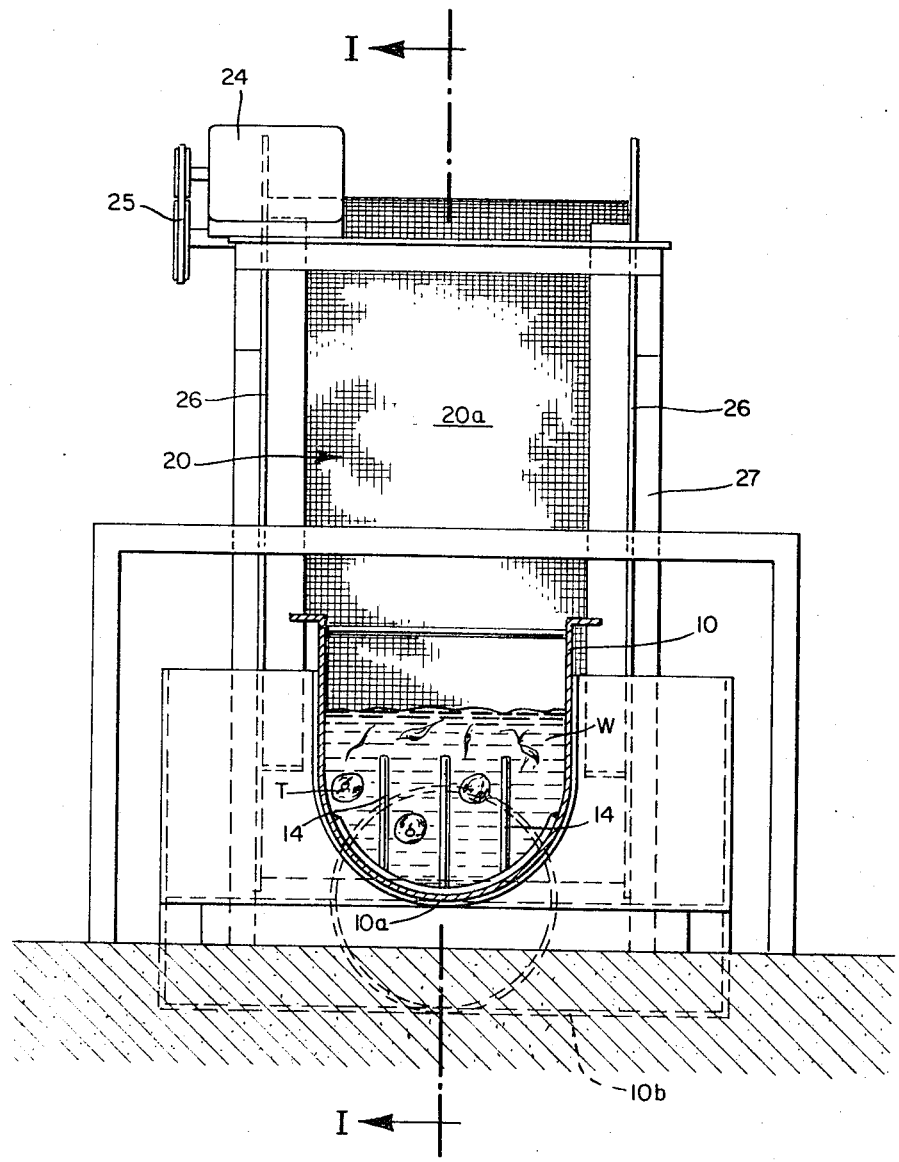
FIG. 2 is a front view of the apparatus shown in FIG. 1 taken along the lines and arrows II—II of FIG. 1.
Figure 3:
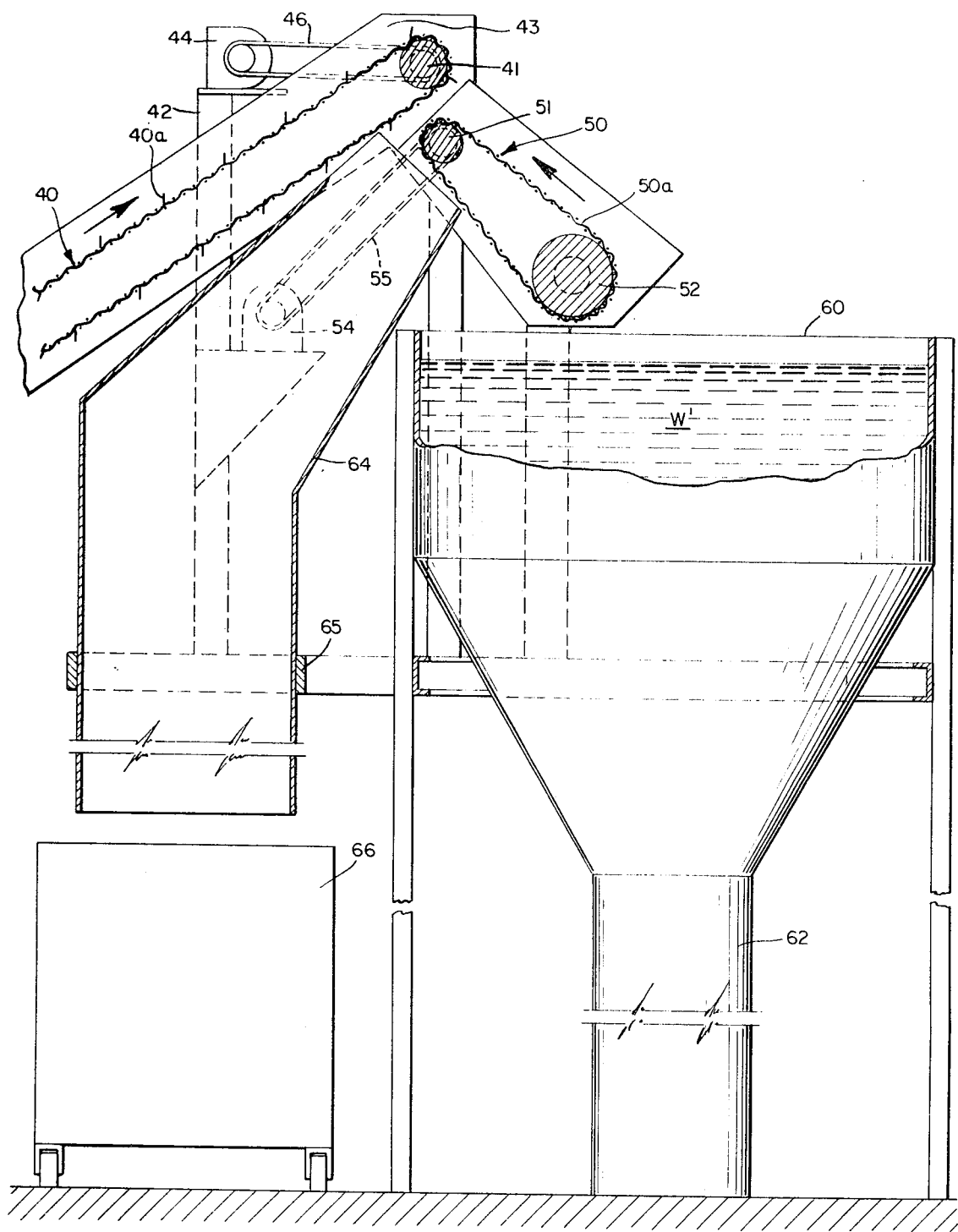
FIG. 3 is a diagrammatic side view of a modified form of the invention.

One modification of the apparatus of this invention is shown in FIG. 3 and differs from the form illustrated in FIGS. 1 and 2 in that the tomatoes and trash together are first lifted by a conveyer 40 and then continuously dropped on moving belt 50 which separates the trash from the tomatoes in a manner similar to that described in connection with belt 20. Belt 40 is equipped with a series of transverse flights 40a to lift the round fruit as well as the waste material. Belt 50 is a simple, flexible link belt similar to belt 20 of FIG. 1 and 2. Conveyer 40 advances around top sprocket 41 and a lower sprocket not shown and is supported by a frame 42 and other structure. Side panels 43 retain the material on the conveyer and the belt is driven by motor 44 and drive belt 46. Belt 50 has a flat, upwardly moving surface 50a, moving around a pair of sprockets 51, 52, and is driven by motor 54 through a link belt 55. The plane of movement of belt surface 50a is approximately 38° but satisfactory results may be obtained by a belt inclination between 10° and 50° depending on the coarseness of the belt surface and the roundness of the fruits.

A funnel 60 containing a level of water W' is located beneath belt 50 to receive the tomatoes rolling down the belt. The tomatoes are then transported through conduit 62 and then through underground pipes not shown to a station for further processing.

A chute 64 supported by frame 65 is located adjacent top sprocket 51 to receive the trash discharged from upwardly moving belt 50. A movable container 66 is located beneath chute 64 to collect the trash for ultimate disposal.

This form of the apparatus of this invention operates substantially as follows. The fruit or vegetables together with leaves, vines, and other forms of waste material are mechanically loaded on the conveyer 40 and lifted to a height above the separating belt 50. The material then drops off conveyer 40 as it passes around sprocket 41 onto flat, upwardly moving surface 50a of belt 50 and the tomatoes roll and cascade down into the water W' in the funnel 60. The trash may initially roll downwardly a short distance on belt surface 50a but then it catches and begins to move with the belt because of its shape and the coarse surface of the belt. The waste is carried upwardly, around sprocket 51, and then falls off and down chute 64 into the container 66. The tomatoes, now substantially free from trash, are received in the funnel 60.

It is readily apparent that various modifications and changes may be made in the preferred forms of the apparatus as described by those skilled in the art without departing from the spirit of the invention. For example, the angle of inclination of belts 20 and 50 may be varied along with the composition and the speed of rotation of the belts. Also, rods 14 may vary in shape and location as the type of fruit and plant waste material varies in size and shape. The word "fruits," as used herein, includes all types of fruits and vegetables which have a sufficiently round or curved shape to allow them to roll when placed on an inclined surface.

I claim:

1. Apparatus for separating fruits from trash and the like comprising: a flume containing a flow of water in which fruits and trash are carried in one direction; a plurality of generally upright, spaced-apart rods located within and across the flume at one point and beneath the surface of flow, the rods having lower ends located adjacent the bottom of the flume and upper ends adjacent the surface of the flow and inclined in the direction of flow so as to direct trash moving in the flow upwardly toward the surface; an inclined, endless, porous belt having a flat, upwardly moving surface positioned transverse to the direction of flow with its lower end within the flow and adjacent and downstream of the rods, said belt having an upper end located out of the flume whereby trash is carried by the flow onto the lower end of the belt, adheres to the surface of the belt, and is carried out of the flow while fruits pass beneath the belt or roll down the belt and return to the flow; and said flume having a drop in level at a position intermediate said rods and said belt to cause a corresponding drop in level of the water flow at said position.

2. The apparatus as defined in claim 1 further including;
said drop in the level of the water flow located immediately in front of the lower end of the belt so that the lower portion of flow drops beneath the belt and continues along the flume while the surface portion of the flow is thrown against the surface of the belt causing the trash to be collected on the belt while the water passes through the belt.

3. The apparatus as defined in claim 1 wherein the upwardly moving surface of the belt is inclined at an angle of approximately 38° from the horizontal plane.

4. The apparatus as defined in claim 3 further including
a water spray located adjacent the top end of the belt to direct a spray of water through the belt after it has begun to descend to remove trash adhering to the belt.

5. A process for separating fruits from leaves, vines, and similar plant waste including the steps of mixing the fruits and waste in a flow of water moving in one direction at a given level, employing a plurality of generally upwardly-directed rods inclined in the direction of flow of the water and immersed in the water to segregate at least a major portion of the plant waste from the fruits by directing the plant waste toward the upper surface of the water, effecting a drop in the level of the water, passing the fruits and waste over said drop in the level of the flow to cause the waste to be thrown outwardly with the surface portion of the water onto a porous belt and simultaneously cause the fruits to drop downwardly beneath said belt, and lifting the waste from the flow by said belt, said belt mounted partially within the flow and having an inclined, upwardly moving surface transverse to the flow.

6. The process as defined in claim 5 wherein
the rods are inclined at an angle between 10° and 60° from the horizontal plane and the belt is inclined at an angle between 10° and 50° from the horizontal plane.

* * * * *